E. I. DODDS.
METHOD OF MANUFACTURING BOLTS.
APPLICATION FILED MAR. 27, 1915.
Patented Dec. 26, 1916.
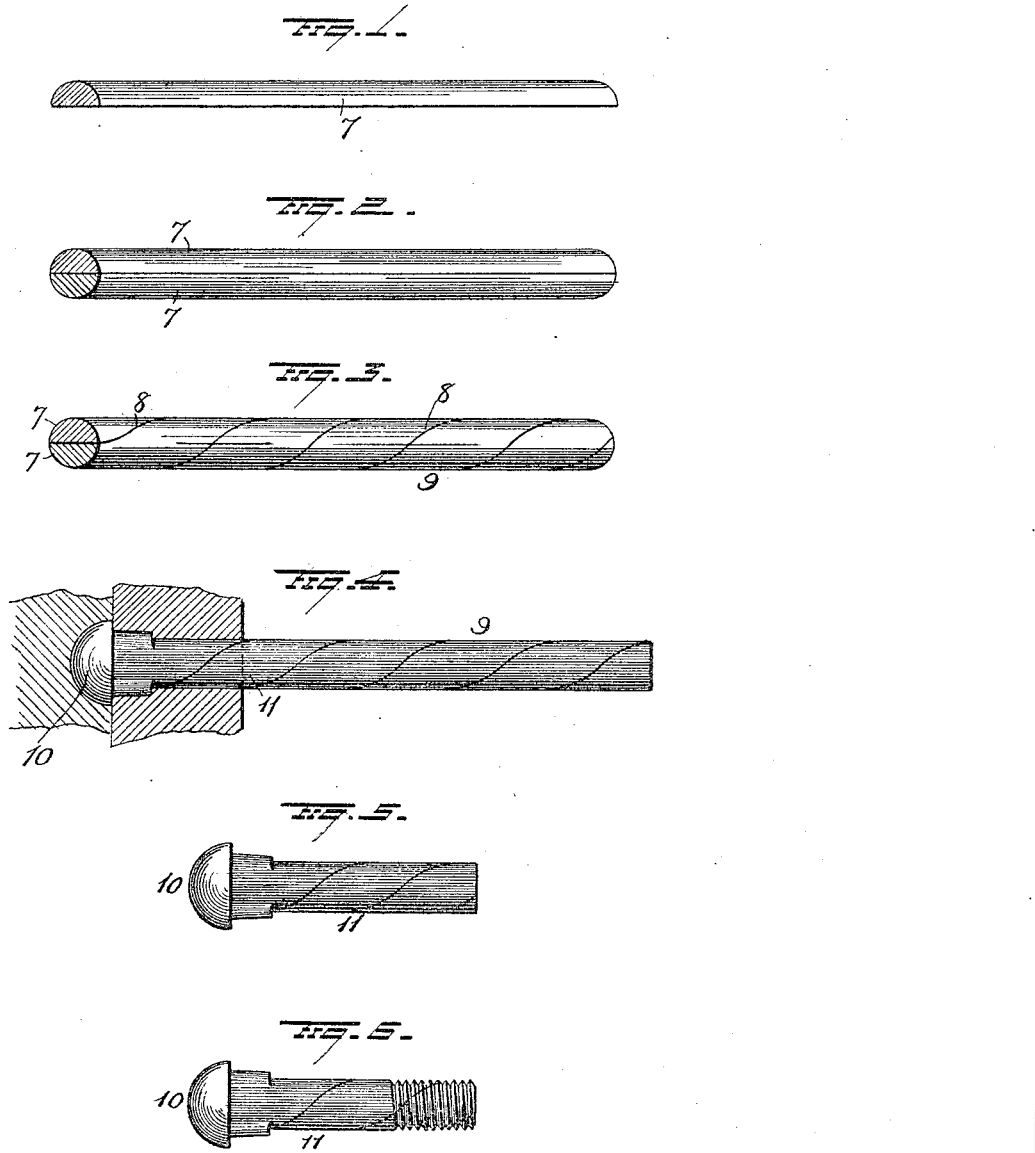

UNITED STATES PATENT OFFICE.

ETHAN I. DODDS, OF PITTSBURGH, PENNSYLVANIA, ASSIGNOR TO FLANNERY BOLT COMPANY, OF PITTSBURGH, PENNSYLVANIA.

METHOD OF MANUFACTURING BOLTS.

1,209,947.  Specification of Letters Patent.  Patented Dec. 26, 1916.

Application filed March 27, 1915. Serial No. 17,524.

*To all whom it may concern:*

Be it known that I, ETHAN I. DODDS, of Pittsburgh, in the county of Allegheny and State of Pennsylvania, have invented certain new and useful Improvements in Methods of Manufacturing Bolts; and I do hereby declare the following to be a full, clear, and exact description of the invention, such as will enable others skilled in the art to which it appertains to make and use the same.

My invention relates to the method of manufacturing bolts, and more particularly track bolts, and it consists in combining two half round or semi-cylindrical bars to form a cylindrical bar; twisting the bar thus formed spirally either while hot or cold, and then preferably rolling it without welding the two parts thereof; welding and upsetting the bar at one end to form the head of a bolt; cutting the bolt blank from the bar and then welding and upsetting the end of the bar to form the next bolt.

In the accompanying drawings, Figure 1 is a view of a half round section from which the bar is made; Fig. 2 shows two half round bars assembled for twisting; Fig. 3 shows the assembled bars twisted; Fig. 4 shows the end of the twisted bar in head forming dies, and the head formed at one end of the bar; Fig. 5 is a view of the bolt blank and Fig. 6 is a view of the threaded bolt.

In carrying out my method, I take two half round bars 7 of steel, of any length that can be conveniently handled, and after assembling them to form a cylindrical bar, twist the bar thus formed spirally as shown at 8 in Fig. 3. This twisting may be done while the compound bar is either hot or cold, and after the bar has been twisted spirally throughout its length, I prefer to heat and then roll it to straighten it and impart a finish to its surface, without welding the two parts together. The bar 9 thus formed may be made in any rolling mill and sold as bolt stock to the manufacturer of the bolts.

In the manufacture of the bolts from the twisted bar, a head 10 is upset at the end of the bar. This upsetting of the head welds the two parts of the blank together at the head only, leaving the two parts comprising the shank 11 of the bolt free, so that the said shank will be free to give or yield under stresses to which the bolt may be subjected. During the operation of upsetting the head 10 at the end of the bar, or thereafter as may be preferred, the bar is severed a bolt's length from the head end to form the bolt blank which may be of any length. After the bolt blank has been severed from the bar, the end of the latter is headed and the blank severed, and the operation continued until the whole bar has been converted into blanks. After the blanks have been formed they are threaded to complete the bolts as shown in Fig. 6.

By twisting the sectional bar from which the blanks are cut, the twist will be constant and uniform from end to end, and consequently uniform in the blanks that are cut from the bar. The upsetting of the head, welds the two parts at the head, but leaves the contacting faces of the two parts of the shank disconnected, thus permitting the latter to give or yield when subjected to tensile or lateral stresses.

While I have referred to forming the head on the end of the bar, and severing the bar a bolt's length from the head, I do not intend to limit my invention to such sequence of steps, as the severing may precede the welding or it may be simultaneous therewith.

Having fully described my invention what I claim as new and desire to secure by Letters-Patent, is:—

1. The method herein described of making flexible bolts, consisting in assembling two semi-cylindrical bars to form a cylindrical bar, spirally twisting the bar thus formed throughout its length, upsetting and welding an end of the bar to form a head for a bolt, severing the bar a bolt's length from the head, and repeating the operation of heading and severing throughout the length of the bar.

2. The method herein described of making flexible bolts, consisting in assembling two semi-cylindrical bars to form a cylindrical bar, spirally twisting the bar throughout its length, rolling the twisted bar, welding and upsetting an end of the bar to form a head, severing the bar a bolt's length from the head and repeating the operation of heading and severing throughout the length of the bar.

3. The method herein described of making flexible bolts, consisting in assembling two semi-cylindrical bars to form a cylindrical bar, spirally twisting the bar thus formed, upsetting and welding an end of the bar to form a head for a bolt, severing the bar a bolt's length from the head, repeating the operations throughout the length of the bar, and threading the bolts.

4. The method herein described of making bolts consisting in assembling two semi-cylindrical bars to form a cylindrical bar, upsetting and welding an end thereof to form a head for a bolt, severing the bar a bolt's length from the head, repeating the operation throughout the length of the bar and threading the bolts.

In testimony whereof, I have signed this specification in the presence of a subscribing witness.

ETHAN I. DODDS.

Witness:
F. H. ALLISON.

Copies of this patent may be obtained for five cents each, by addressing the "Commissioner of Patents, Washington, D. C."